July 3, 1923.

R. T. ASHLEY

DRAFT MEANS

Filed March 20, 1922

1,460,564

INVENTOR.
RAYMOND T. ASHLEY
BY Bradley L. Benson
ATTORNEY.

Patented July 3, 1923.

1,460,564

UNITED STATES PATENT OFFICE.

RAYMOND T. ASHLEY, OF RENO, NEVADA.

DRAFT MEANS.

Application filed March 20, 1922. Serial No. 545,223.

*To all whom it may concern:*

Be it known that I, RAYMOND T. ASHLEY, a citizen of the United States of America, residing at Reno, in the county of Washoe and State of Nevada, have invented certain new and useful Improvements in Draft Means, of which the following is a specification.

The present invention is an improved draft means and relates to that class of appliances which are interposed between tractors and plows, or like implements, in agricultural or other heavy duty operations.

The objects of this invention include;

(1) The provision of a draft means or tractor hitch which will automatically compensate or cause the pulled implement to trail accurately over the course traversed by the tractor, and one which will be operative whether the movement of the vehicles be forward or reverse.

(2) The provision of a tractor hitch in which the pull of the tractor is transmitted to the pulled implement through a flexible member arranged to maintain an even distribution of the pulling stress under various relative angular positions of tractor and implement, and with which means are provided for locking the entire hitch in any of said angular positions so that the device will become operative upon, and be responsive to a push or rearward movement of the tractor.

Other objects and advantages will appear as this description proceeds.

While the invention is here shown in the form considered to be the best, it is not confined to this form as it may be embodied in other forms, and it is to be understood that in the following specification and the appended claims it is desired to cover the invention in whatsoever form it may be embodied.

In the accompanying one sheet of drawings.

Figures 1, 2:
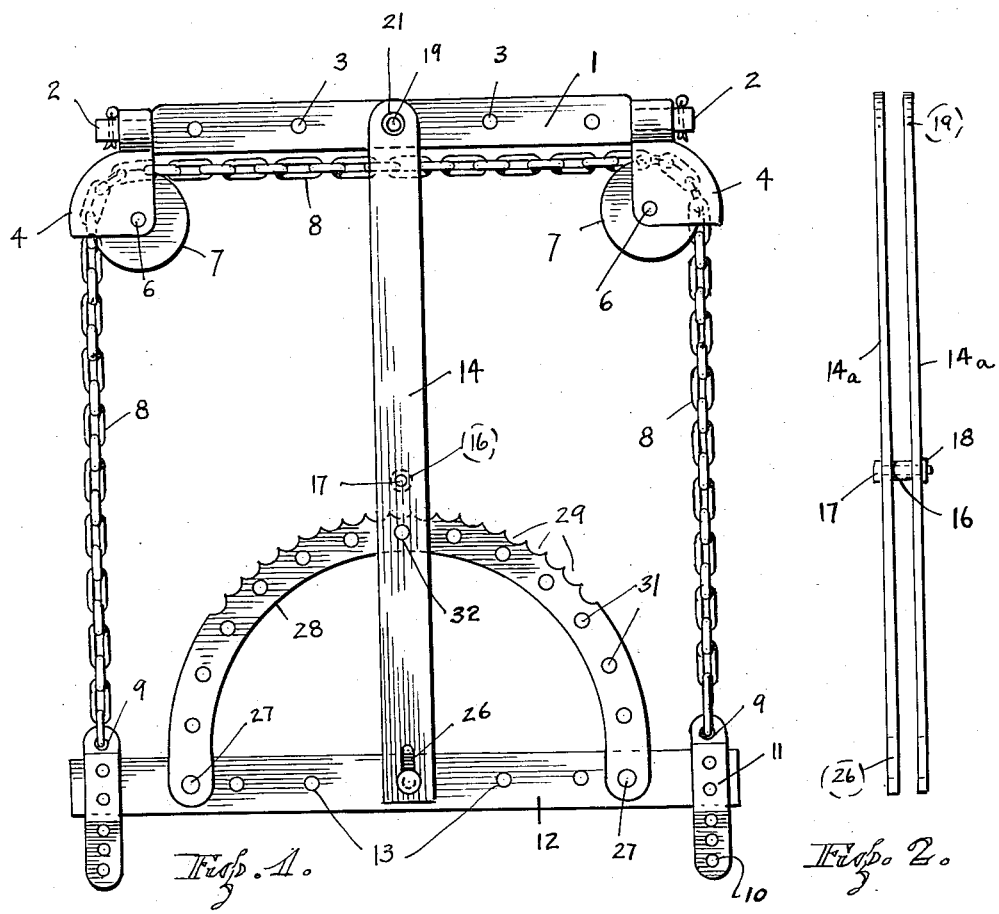
Figure 1 is a top plan view of my device.
Figure 2 is a side elevation of a reach member.

Referring to the drawings, the numeral 1 indicates a flat bar or forging provided on the ends with shafts or spindles 2. The bar 1 is provided with apertures 3 for bolt connection with a tractor frame.

Journalled on the spindles 2 are sheave housings 4 carrying pivot pins 6 on which are rotatively mounted sheaves 7. A chain 8 is reeved through the sheaves 7 and is in substantially the shape of a letter U. The ends of the U-shaped chain 8 are secured in eyes 9 in cleats 11 and 11ª. These cleats surround and are bolted to a bar 12. The cleats are also provided, on the ends thereof remote from the chain 8 with apertures 10, the plurality of which affords a means of securing the device to a plow or implement at various angular positions relative to the hitch.

The bar 12 is also provided with apertures 13 for bolt connection with an implement.

The bars 1 and 12 are connected and spaced from each other by means of a reach or bridge member 14, shown in edge view in Fig. 2. Two parallel flat bars 14ª are spaced apart by a bushing 16 and a bolt 17 extends through both bars and through said bushing in which position it is secured by a nut 18.

Figure 3:
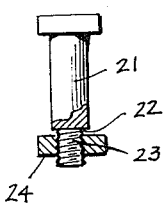
Figure 3 is a detail showing a bolt or pin.
Figure 4:
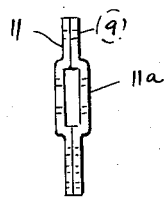
Figure 4 is a detail showing a pair of cleats.

The end of reach 14 adjacent to bar 1 is provided with apertures 19 for securing said end to the bar 1. As this connection is pivotal, the apertures 19 are afforded easy clearance for a bolt 21 shown in Figure 3. This bolt is provided with a shoulder 22 and a reduced portion 23 which is threaded for engagement with a nut 24.

The end of reach 14 adjacent the bar 12 is provided with elongated slots 26. The purpose of these slots is two-fold; first, to afford the same pivotal relation between the reach and the bar 12 as is afforded between the reach and the bar 1 by apertures 19, and thus allow free turning movement of the bars 1 and 12 as the flexible member 8 moves and while the device is under stress of pull; second, to provide means, adapted, when the device is under compression (as would be the case if the movement of the tractor were reversed), to draw the bars 1 and 12 toward each other for the purpose of locking the bars 1 and 12 and the reach 14 in any of the various relative angular positions which the parts might assume at the time the tractor was backed.

This locking is effected as follows; secured to the bar 12, as by bolts 27, is a sector 28, the curve of which is struck from the center of that end of slot 26 which is remote from bar 12. The sector 28 is provided with notches 29 adapted to engage the bushing 16 when the bars 1 and 12 are compressed.

It will be seen that (because of the elongation of slots 26) when the device is under stress of pull, the reach 14 will assume the position shown in Fig. 1, and that the bars 1 and 12 will be free for pivotal movement, as one leg of the U-shaped chain lengthens at the expense of the other.

It will also be apparent that, when the tractor is backed, the chain will slacken slightly and the rearward movement of the reach 14 will cause bushing 16 to engage in one of notches 29, and, upon this engagement, the bar 12 is rigid with respect to reach 14, while the chain 8 holds the bar 1 in rigid position.

It is sometimes desirable to offset a plow from the direct line of draft and to effect this I provide bolt holes 31 in the sector 28, which, when the parts are rotated, register successively with bolt holes 32 in reach 14. It will be seen that a pin or bolt extended through holes 32 and one of holes 31 will lock the device at a given offset or angle.

I claim;

1. A draft device for interposition between a tractor and an implement comprising a reach member disposed lengthwise with respect to the line of pull or draft, a pair of transverse bars pivoted to said reach, sheaves on one of said bars and positioned on opposite sides of said reach, and a substantially U-shaped flexible member reeved through said sheaves and secured at the ends thereof to the other of said bars and adapted, when one of said bars is rotated on its pivot, to rotate the other bar to a like degree in the opposite direction.

2. A draft device for interposition between a tractor and an implement comprising a reach member disposed lengthwise with respect to the line of draft, a pair of transverse bars pivoted to said reach, sheaves on one of said bars and positioned on opposite sides of said reach, a flexible member reeved through said sheaves and secured at the ends thereof to the other of said bars in substantially U-shape and adapted, when one of said bars is rotated on its pivot, to rotate the other bar to a like degree in the opposite direction, and means, responsive to a compressive force on said bars, whereby the bars will be held rigid in relation to said reach.

3. A draft means for interposition between a tractor and an implement comprising a bar provided with means for attachment to a tractor, a bar provided with means for attachment to an implement, a reach member pivotally connected near the ends thereof with said bars, sheaves mounted on one of said bars and capable of being rotated on a horizontal plane and also on a vertical plane and equidistant from said reach, and a flexible member reeved through said sheaves and secured at the ends thereof to the other of said bars.

In testimony whereof I affix my signature.

RAYMOND T. ASHLEY.